United States Patent
Nemeth et al.

(10) Patent No.: US 7,258,795 B1
(45) Date of Patent: Aug. 21, 2007

(54) REGENERABLE ADSORBENTS FOR PURIFICATION OF CLEANING SOLVENTS

(75) Inventors: Laszlo T. Nemeth, Barrington, IL (US); Anil R. Oroskar, Oakbrook, IL (US); Edith M. Flanigen, White Plains, NY (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 11/260,965

(22) Filed: Oct. 28, 2005

(51) Int. Cl.
*B01D 15/00* (2006.01)
(52) U.S. Cl. .................. 210/670; 210/679; 210/690
(58) Field of Classification Search ............. 210/670, 210/679, 690; 502/56; 8/142
See application file for complete search history.

(56) References Cited

U.S. PATENT DOCUMENTS

| 6,312,476 B1 * | 11/2001 | Perry et al. | ................ 8/142 |
|---|---|---|---|
| 6,521,580 B2 | 2/2003 | Perry et al. | ............ 510/285 |
| 6,541,539 B1 | 4/2003 | Yang et al. | ............ 523/200 |

\* cited by examiner

*Primary Examiner*—Matthew O. Savage
(74) *Attorney, Agent, or Firm*—Frank S Molinaro; Arthur E Gooding

(57) ABSTRACT

A process and adsorbent for removing contaminants from silicone based solvents is disclosed. The process provides for cleaning a solvent for reuse, and regeneration of the adsorbent. The adsorbents are for adsorbing organic and inorganic compounds that have accumulated in the silicone solvents.

15 Claims, No Drawings

REGENERABLE ADSORBENTS FOR PURIFICATION OF CLEANING SOLVENTS

FIELD OF THE INVENTION

The present invention relates to adsorbents for the use of purifying used silicone based solvents that are used in the dry cleaning process.

BACKGROUND OF THE INVENTION

In the dry cleaning process, clothing or other fabrics to be cleaned are contacted with a solvent that removes dirt, oil and other substances from the clothing. This is a method of removing substances that are on fabrics that are not amenable to removal with aqueous based cleaning detergents. After cleaning the clothing and/or fabrics, the solvent is processed to remove the contaminants that were removed from the clothing, such that the solvent is recycled.

A prominent dry cleaning solvent is perchloroethylene. However, perchloroethylene is an environmental and health hazard, and therefore substitute solvents have been developed for use in the dry cleaning process. There has been increasing pressure on the Dry Cleaning industry to use alternatives to perchloroethylene, that are more environmentally friendly. This has led to the development of new dry cleaning solvents, such as one group of solvents based on silicone, or siloxanes. One particular solvent which has been developed by General Electric is decamethylcyclopentasiloxane, also known as D5. In addition, the new solvent delivers superior fabric quality. This has led to the conversion of about 400 dry cleaning sites from perchloroethylene to the solvent D5.

Today, D5 solvent recovery systems typically use a batch-mode distillation process to purify the solvent. The distillation process is expensive and requires daily, manual intervention to clean the bottom of the distillation apparatus. Improvements in the methods of purifying and recycling cleaning solvents can save energy and money.

SUMMARY OF THE INVENTION

The invention comprises a process for removing contaminants from silicone based solvents. The process involves contacting the solvent with a regenerable high surface area material. The material is an adsorbent having pores in the range from about 0.2 nm to about 50 nm. The adsorbent further has a catalyst deposited on the adsorbent for catalyzing the oxidation of adsorbed organic compounds when the adsorbent is regenerated.

In one embodiment, the adsorbent is surface treated to control the surface acidity to prevent reactions between the solvent and the adsorbent.

In another embodiment, the process further comprises heating the adsorbent during a regeneration step to oxidize the adsorbed organic molecules. The adsorbent is heated to a temperature between 150° C. and 500° C. to facilitate catalytic reactions for decomposing and volatilizing contaminants adsorbed on the adsorbent.

Additional objects, embodiments and details of this invention can be obtained from the following detailed description of the invention.

DETAILED DESCRIPTION OF THE INVENTION

Replacement cleaning solvents for perchloroethylene include silicone based compounds that are volatile cyclic, linear or branched siloxane compounds. Examples of these siloxane compounds include, but are not limited to, hexamethyldisiloxane, octamethyltrisiloxane, decamethyltetrasiloxane, dodecamethylpentasiloxane, tetradecamethylhexasiloxane or hexadecamethylheptasiloxane or methyltris (trimethylsiloxy) silane, octamethylcyclotetrasiloxane (D4), decamethylcyclopentasiloxane (D5), dodecamethylcyclohexasiloxane, and tetradecamethylcycloheptasiloxane. Further description of these compounds is found in U.S. Pat. No. 6,521,580, issued on Feb. 18, 2003, and is incorporated by reference in its entirety.

After use of the cleaning solvent in the dry cleaning process, a typical average single cycle contamination level is 0.3% (or 3000 ppm) by weight. The contaminants generally fall into four major types of solvent soluble contaminants. They are surfactants, that make up to about 50% to 75%; fatty acids, that comprise about 10% to 20%; glycerides that comprise about 10% to 20%; and non-polar compounds, such as waxes, and hydrocarbons, which comprise about 5% to 20%. This list is not meant to be comprehensive, but is only representative of the make up of contaminants found in a dry cleaning solvent after a cleaning cycle.

The removal of contaminants from the silicone based solvents allows for recycling and reduces the amount of solvents that need to be disposed. The current method of recycling the solvent is through distillation. A better method of recycling the solvent is contacting the solvent with an adsorbent for removing the contaminants from the solvent. The adsorbent which can be used for removing contaminants comprise those having a high surface area and pores from about 0.2 nm to about 50 nm. The surface area is preferably greater than 500 $m^2/g$. Using adsorbents provides an economical method of removing contaminants, and adsorbents that are regenerable are preferred. The adsorbents further include a catalyst deposited on the adsorbent. The catalyst provides enhanced regenerative capabilities for the adsorbent.

The preferred adsorbent will have a mesoporous structure to provide for adsorption of large organic molecules that are in the solvent. The adsorbent can have a combination of meso and micro pores to increase the adsorption surface area while providing the benefit of large pores for adsorption of large molecules.

A typical analysis of D5 solvent after using a filter only recovery system highlights the need to improve the removal of materials dissolved in the solvent. Using only a carbon filter recovery system leaves a contamination level of about 2% by weight. The choice of adsorbent is selected to reduce the contamination level to below 500 ppm by weight, and preferably to below 100 ppm by weight.

Adsorbents usable in this process include inorganic oxides, aluminas, silicas, silica-aluminas, zeolites, molecular sieves, mesoporous crystalline materials, mesoporous carbon materials, mesoporous micelle-templated materials, mixed metal oxides, and mixtures thereof. It should be noted that the term silica-alumina does not mean a physical mixture of silica and alumina but means an acidic and amorphous material that has been cogelled or coprecipitated. In this respect, it is possible to form other cogelled or coprecipitated amorphous materials that will also be effective as adsorbents. These include silica-magnesias, silica-zirconias, silica-thorias, silica-berylias, silica-titanias, silicaalumina-thorias, silica-alumina-zirconias, aluminophosphates, mixtures of these, and the like. Preferably, the adsorbents will be selected from one or more of silicas, activated aluminas and molecular sieves, that have mesoporous structures.

One choice of adsorbent is carbon in the form of granular activated carbon. The form of activated carbon is one that has been made with mesopores having pores with an average diameter greater than 5 nm. A microporous activated carbon, or non-porous carbon will not adsorb large organic molecules to any appreciable extent, thereby limiting a microporous activated carbon's usefulness. The thermal processing of carbon creates small porous particles with a large internal surface area. Typically, the carbon is derived from an organic source, such as wood, ground coconut shells, or the like. The activated carbon attracts and adsorbs organic and inorganic molecules. The form of activated carbon can be granular activated carbon, surface oxidized granular activated carbon, a graphite, a graphite oxide, or carbon nanomaterials. Examples of carbon nanomaterials include, but are not limited to, carbon nanotubes, carbon nanohorns, carbon nanofibers, buckyballs, and the like. The activated carbon materials can include carbon materials with surface modification. The surface modification is performed by covalently bonding of acidic or basic materials to control acidity, or the incorporation of metals for catalytic decomposition of adsorbed organic compounds.

Another choice of adsorbent is mesoporous micelle-templated silica (MTS). MTS are large surface area from about 700 to about 900 $m^2/g$, and large pore size from about 5 to about 9 nm crystals. The silica is structured by triblock copolymers using ethylene oxide (EO) and propylene oxide (PO) polymers, e.g. $(EO)_{20}(PO)_{70}(EO)_{20}$ formed from polyethylene oxide (PEO) and poly-propylene oxide (PPO). Recently, there has been research into the synthesis of high surface area metal oxides through the use of large surfactant molecules. This process is called surfactant templating, wherein the surfactant in a liquid solution forms micelles that give rise to an ordered structure. For a given surfactant, the micelles are essentially uniform in size and the process gives rise to a material having a very uniform structure. The size of the pores are dependent on the type of surfactant, surfactant concentration, the size of the surfactant chain, and operating conditions such as temperature. The MTS can be formed at temperatures between room temperature and about 100° C. Pore sizes of the MTS materials range from about 2 nanometers (nm) to about 30 nm. Examples of the synthesis process are found in U.S. Pat. No. 6,541,539, which is incorporated by reference in its entirety.

One choice of MTS for an adsorbent is SBA-15 which has a well-defined hexagonal structure. This structure is similar to MCM-41, but has advantages in that the cell walls are thicker and thus are mechanically more stable materials. MTS materials have cell walls from 3.5 to 5.3 nm thick, whereas MCM-41 materials typically have cell walls less than 1 nm thick. A typical SBA-15 is synthesized at about 100° C. and then calcined at about 550° C. This gives a typical BET surface area of about 850 $m^2/g$ with a pore size of about 8.9 nm according to the Broekhoff and de Boer method. Other methods can give different results, and suggests that there is some microporosity or surface roughness in the samples.

MTS materials provide large pores for adsorbing large organic molecules, and can have catalytic materials deposited in the pores without significantly reducing the pore volume for the adsorption of contaminants.

The addition of a catalyst to the adsorbent contributes to the regeneration of the adsorbent. The catalyst changes the regime for regenerating the adsorbent by allowing for removal of volatile organic compounds (VOCs) through catalytic oxidation rather than thermal oxidation. Thermal oxidation requires heating the adsorbent to temperatures from about 750° C. to about 1100° C., with a typical range from 800° C. to about 850° C. Catalytic oxidation allows for much lower temperatures, typically at 150° C. to 500° C. The reaction temperature and times depend on the catalyst used and the VOCs to be oxidized. This can be optimized by looking at the balance between amount of catalyst and the temperature of operation for oxidation. As the amount of catalyst is reduced, the temperature of operation needs to be increased.

Catalysts that are useable for oxidizing organic compounds include metals such as scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), gallium (Ga), germanium (Ge), indium (In), thallium (Tl), tin (Sn), lead (Pb), antimony (Sb), bismuth (Bi) and polonium (Po). There are two major classes of VOC oxidation catalysts: noble metals and base metals. The noble metals comprise rhodium, palladium, silver, platinum, gold and iridium, and preferredly are deposited in the metal state on the adsorbent. The base metals comprise scandium, titanium, vanadium, chromium, manganese, iron, cobalt, nickel, copper, zinc, yttrium, zirconium, niobium, molybdenum, technetium, ruthenium, cadmium, hafnium, tantalum, tungsten, rhenium, osmium, gallium, germanium, indium, thallium, tin, lead, antimony, bismuth and polonium. The base metals are generally used as catalysts when they are oxides of the metals. Preferred base metal catalysts are oxides of transition metals, especially oxides of manganese, copper, cobalt, chromium, iron and nickel.

It has also been found that mixed metal oxides are often more active than the individual metal oxides, and the stability of a catalyst can be dependent on its preparation. An example of a mixed metal oxide that is more active than either of the metal oxides is copper chromite, $CuCr_2O_4$. Copper chromite exhibits significantly greater activity than any of the oxides of copper, chromium oxide ($Cr_2O_3$), or of the metals.

Optionally, the adsorbent can have the surface treated to control surface activity, or surface acidity. The control of surface acidity is to limit or prevent degradation of the silicone based solvent during the process of removing contaminants. Different adsorbents require different treatments for modifying the surface acidities of the adsorbent. For instance, the modification of surface acidity can be accomplished through physical and/or chemical adsorption of basic molecules to surface acid sites.

Surface modification of zeolites, silica-aluminas, micelle templated silica-aluminas, and other adsorbents having alumina acid sites is accomplished by dealumination. It is preferred that silicas, including zeolites, silicas and silica-aluminas, are silylated where the surface of the particles have been treated to increase the surface hydrophobicity.

Other surface modification treatments include liquid phase ion exchange, wherein the ion exchange involves substituting alkali or alkaline earth metal cations with the acid sites, and surface adsorption of basic molecules on the surface acid sites. In particular, cations used in the ion exchange include sodium (Na), potassium (K), cesium (Cs), magnesium (Mg), and calcium (Ca).

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A process for removing contaminants from a silicone based solvent, comprising:
contacting the solvent with a regenerable high surface area adsorbent at adsorption conditions thereby adsorbing at least a portion of the contaminants and providing a purified solvent, the adsorbent characterized in that it has pores from about 0.2 nm to about 50 nm, and having a catalyst deposited on the adsorbent for catalyzing the oxidation of adsorbed contaminant compounds.

2. The process of claim 1 wherein the adsorbent has both meso and micro pores.

3. The process of claim 1 wherein the adsorbent is selected form the group consisting of inorganic oxides, aluminas, silicas, silica-aluminas, zeolites, molecular sieves, mesoporous crystalline materials, mesoporous carbon materials, mesoporous micelle-templated silica materials, granular activated carbon, graphite, graphite oxide, surface oxidized granular activated carbon, carbon nanotubes, carbon nanohorns, carbon nanofibers, buckyballs, and mixtures thereof.

4. The process of claim 3 wherein the adsorbent is mesoporous micelle-templated silica.

5. The process of claim 3 wherein the adsorbent is selected from the group consisting of zeolites, molecular sieves, and mixtures thereof, and the adsorbent is characterized in that its acidity is modified by liquid phase ion exchange with an alkali or alkaline earth metal cation.

6. The process of claim 3 wherein the adsorbent is selected from the group consisting of zeolites, molecular sieves, and mixtures thereof, and the adsorbent is characterized in that its acidity is modified through silylation.

7. The process of claim 3 wherein the adsorbent is selected from the group consisting of zeolites, molecular sieves, and mixtures thereof, and the adsorbent is characterized in that its acidity is modified through adsorption of basic molecules on the surface.

8. The process of claim 1 wherein the catalyst comprises a metal component and the metal is selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), gallium (Ga), germanium (Ge), indium (In), thallium (Tl), tin (Sn), lead (Pb), antimony (Sb), bismuth (Bi), polonium (Po) and mixtures thereof.

9. The process of claim 8 wherein the metal is selected from the group consisting of rhodium (Rh), palladium (Pd), silver (Ag), platinum (Pt), gold (Au) and mixtures thereof.

10. The process of claim 8 wherein the metal component is a metal oxide and the metal is selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), cadmium (Cd), hafnium (Hf), tantalum (Ta), tungsten (W), rhenium (Re), osmium (Os), iridium (Ir), gallium (Ga), germanium (Ge), indium (In), thallium (Tl), tin (Sn), lead (Pb), antimony (Sb), bismuth (Bi), polonium (Po) and mixtures thereof.

11. The process of claim 10 wherein the metal oxide has a metal selected from the group consisting of chromium (Cr), manganese (Mn), iron (Fe), cobalt (Co), nickel (Ni), copper (Cu) and mixtures thereof.

12. The process of claim 1 further comprising regenerating the adsorbent by heating the adsorbent at a temperature sufficient to oxidize the adsorbed contaminant organic compounds.

13. The process of claim 12 wherein the regeneration temperature is from about 150° C. to 500° C.

14. The process of claim 1 wherein the purified solvent contains less than 500 ppm by weight of contaminant compounds.

15. The process of claim 14 wherein the purified solvent contains less than 100 ppm by weight of contaminant compounds.

* * * * *